United States Patent [19]

Citta et al.

[11] Patent Number: 5,121,208
[45] Date of Patent: Jun. 9, 1992

[54] METHOD AND APPARATUS FOR REDUCING CO-CHANNEL INTERFERENCE IN AN HDTV RECEIVER

[75] Inventors: Richard W. Citta, Oak Park; Gary J. Sgrignoli, Mt. Prospect, both of Ill.

[73] Assignee: Zenith Electronics Corporation, Glenview, Ill.

[21] Appl. No.: 600,457

[22] Filed: Oct. 19, 1990

[51] Int. Cl.$^5$ .................. H04N 9/64; H04N 5/14; H04N 5/213; H04N 11/20
[52] U.S. Cl. ..................... 358/166; 358/36; 358/167; 358/11
[58] Field of Search ............ 358/166, 167, 11, 12, 358/141, 36, 37, 83; 455/303, 305, 295, 296

[56] References Cited

U.S. PATENT DOCUMENTS

| | | |
|---|---|---|
| 4,794,447 | 12/1988 | Tsinberg .................. 358/12 |
| 4,837,611 | 6/1989 | Faroudja .................. 358/16 |
| 4,870,489 | 9/1989 | Ducret .................. 358/11 |
| 4,888,641 | 12/1989 | Isnardi et al. .................. 358/141 |
| 4,907,069 | 3/1990 | Bret .................. 358/12 |
| 4,916,525 | 4/1990 | Drummond .................. 358/12 |
| 4,918,515 | 4/1990 | Faroudja .................. 358/11 |

OTHER PUBLICATIONS

J. S. Lothian, "A Comb Filter Suppression of Co-Channel Interference on Television Signals", Jul. 14, 1978.

Primary Examiner—James J. Groody
Assistant Examiner—Glenton B. Burgess

[57] ABSTRACT

NTSC co-channel interference is reduced in an HDTV receiver by developing an interference signal that is representative of the high energy components in the NTSC signal and subtracting the interference signal from the received HDTV signal to produce an enhanced HDTV signal for processing.

12 Claims, 2 Drawing Sheets

METHOD AND APPARATUS FOR REDUCING CO-CHANNEL INTERFERENCE IN AN HDTV RECEIVER

CROSS REFERENCE TO RELATED APPLICATION

This application discusses method and apparatus described and claimed in copending application Ser. No. 238,956, filed Aug. 31, 1988, entitled TV SIGNAL TRANSMISSION SYSTEM AND METHOD, which is incorporated by reference herein.

BACKGROUND OF THE INVENTION AND PRIOR ART

This invention relates generally to high definition television systems (HDTV) and particularly to a method of minimizing NTSC co-channel interference in an HDTV television receiver.

The recently announced Spectrum Compatible HDTV System from Zenith Electronics Corporation includes, among other things, a hybrid signal in which the low frequency, high energy video components are subtracted and represented by encoded data in non-video portions of the transmitted signal. The reduction in energy and interference-causing ability of the transmitted signal permits the use of the so-called "taboo" television channels and greatly increases the spectrum available for television broadcasting. The present invention is concerned with a technique for minimizing the interfering effects of a co-channel NTSC signal in an HDTV receiver.

OBJECTS OF THE INVENTION

A principal object of the invention is to provide an improved HDTV receiver.

Another object of the invention is to provide an improved HDTV broadcasting system.

A further object of the invention is to provide a television system capable of utilizing taboo channels.

Still another object of the invention is to provide an HDTV receiver with superior NTSC interference rejection.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
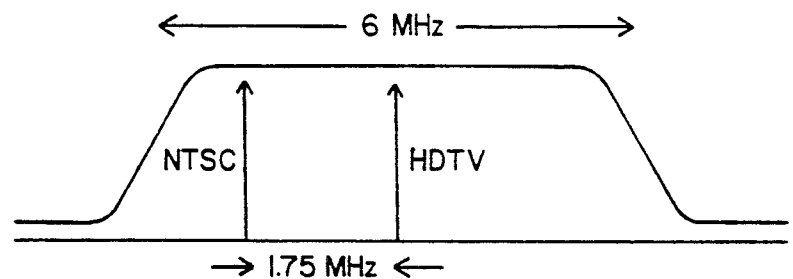
FIG. 1 illustrates a 6 MHz television channel band indicating the position of an HDTV carrier and an NTSC co-channel carrier therein.

In FIG. 1, the general response curve of a 6 MHz wide television signal channel is shown. An HDTV carrier is indicated at the center of the 6 MHz channel, although the invention as described below is equally applicable to systems where the HDTV carrier is offset from this position. The HDTV carrier position is in accordance with the proposed spectrum compatible HDTV television system of Zenith Electronics Corporation which specifies a double sideband suppressed carrier centered in the 6 MHz channel. An NTSC co-channel signal, occupying the same 6 MHz channel spectrum, has its carrier offset 1.75 MHz from the HDTV carrier as illustrated. Therefore, in a co-channel situation, where a receiver is subject to both an NTSC and an HDTV signal, the FIG. 1 depiction applies.

Figure 2:
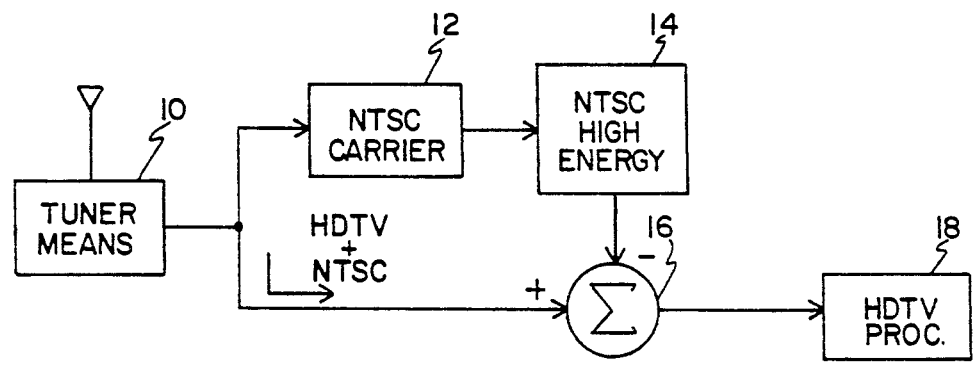
FIG. 2 is a simplified block diagram of an HDTV receiver operating in accordance with the method of the invention.

In FIG. 2, an HDTV receiver includes tuner means 10 connected to supply an output to an NTSC carrier detection circuit means 12 which in turn is coupled to an NTSC high energy circuit means 14. Tuner means 10 also supplies a signal to the positive input of a summer 16. The output of high energy circuit 14 is supplied to the negative input of summer 16 and the output of summer 16 supplies an HDTV processing circuit 18. Assuming the presence of both NTSC and HDTV signals in the output of tuner means 10 as indicated in FIG. 1, NTSC carrier detection circuit 12 detects and provides an output corresponding to the received NTSC carrier. The detected NTSC carrier is applied to NTSC high energy circuit 14 which produces, in response thereto, an output interference signal comprising high energy components of the received NTSC signal. As is fully described in the above copending application, the energy in an NTSC television signal is predominantly in its low frequency components. An interference signal representing the low frequency components of the detected NTSC carrier is therefore developed at the output of NTSC high energy circuit 14 and subtracted from the signal output of tuner means 10, to effectively reduce the NTSC signal energy in the signal supplied to HDTV processor 18. An enhanced HDTV output signal is thereby developed for processing because the amount of interfering NTSC signal has been reduced. One such system is shown in more detail in FIG. 3.

Figure 3:
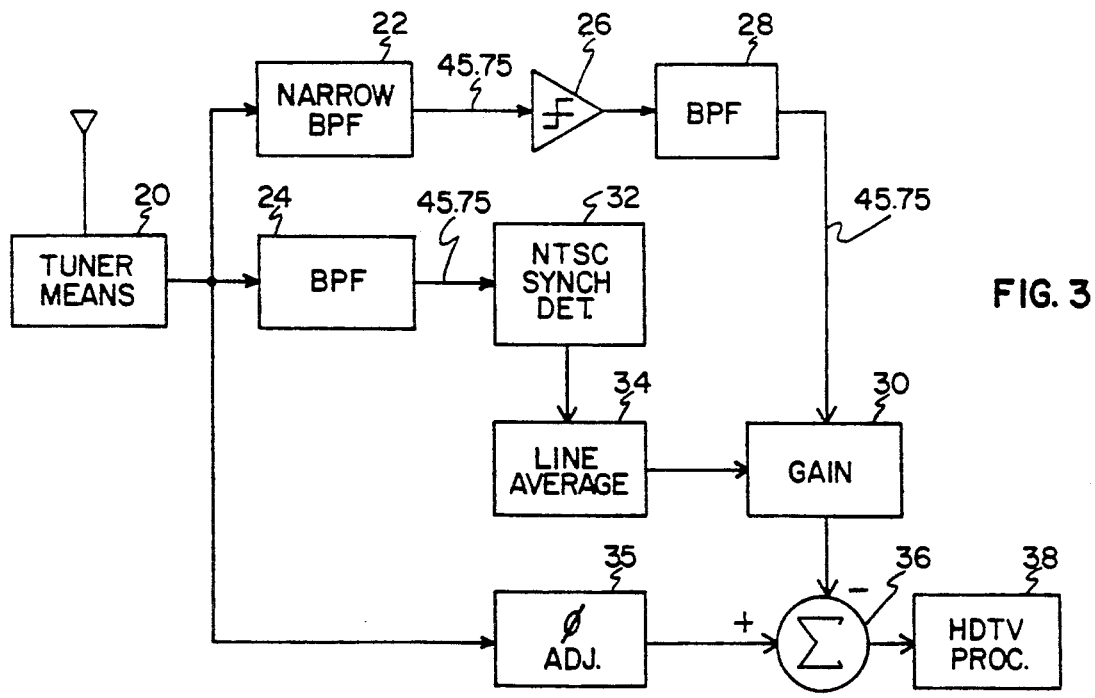
FIG. 3 is a more detailed block diagram of an HDTV receiver operating at IF frequencies.

In the embodiment of FIG. 3, tuner means 20 is coupled to a first narrow bandpass filter 22 and to a second wider bandpass filter 24. Bandpass filter 22 passes the 45.75 MHz NTSC IF frequency and supplies it to a limiter circuit 26 to develop a constant amplitude 45.75 MHz signal. This signal in turn is coupled to another bandpass filter 28 to produce a constant amplitude 45.75 MHz sinewave that is applied to a gain adjustment circuit 30. Bandpass filter 24 passes the 45.75 MHz NTSC IF carrier and supplies it to a synchronous detector 32 where the NTSC baseband signal is recovered. The NTSC baseband signal is applied to a line averaging circuit 34 and its output is used to control the gain of gain adjustment circuit 30 for providing an amplitude modulated 45.75 MHz sinewave signal representing the low frequency components of the interfering NTSC signal. The 45.75 MHz sinewave is subtracted in a subtractor 36 from the output of tuner means 20 to provide an IF output signal to an HDTV processor 38 having a reduced level of NTSC interference. The output of tuner means 20 is supplied to summer 36 through a phase adjustment circuit 35 to compensate for processing delay. Subtraction of the 45.75 sinewave interference signal from the signal output of tuner means 20 yields a significant reduction of the NTSC signal in the output of summer 36. The referenced copending application fully discloses circuitry for removing a line averaged (integrated) signal to reduce the high energy components in an NTSC television signal. Consequently, an enhanced HDTV IF signal is applied to HDTV processor 38.

Figure 4:
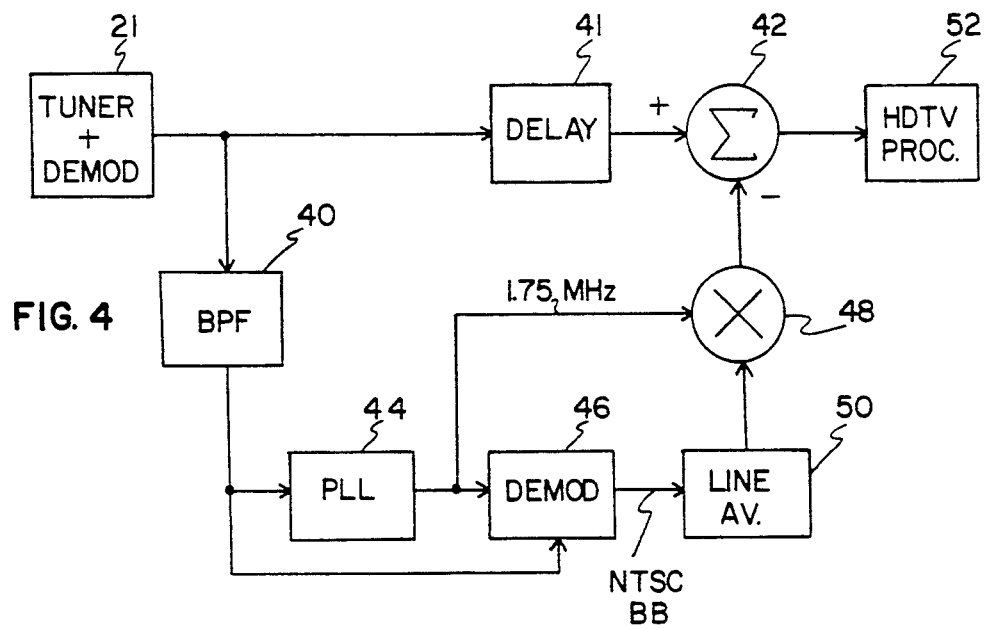
FIG. 4 is a simplified block diagram of an HDTV receiver operating at baseband frequencies.

In FIG. 4, an embodiment of the invention is illustrated in a baseband environment with a tuner and demodulator 21 providing a detected baseband HDTV signal and a 1.75 MHz NTSC interference beat to a bandpass filter 40 and to the positive input of a summer 42 via a delay circuit 41. The bandpass filter 40 supplies a demodulator 46 and a phase locked loop (PLL) circuit 44. PLL 44 provides a constant amplitude 1.75 MHz sinewave signal to a demodulator 46 and to a gain control multiplier 48. Demodulator 46 uses the 1.75 MHz signal from the PLL 44 to demodulate the 1.75 MHz NTSC signal supplied by bandpass filter 40 to derive an NTSC baseband signal which is integrated in a line average circuit 50 to develop a low frequency line averaged signal. This signal is applied to multiplier 48 for multiplication with the 1.75 MHz output of PLL 44 to generate an amplitude modulated 1.75 MHz sinewave. The output of multiplier 48, representing the low frequency components of the received NTSC interfering signal is applied to the negative input of summer 42 and thus is subtracted from the output of tuner and demodulator 21 to provide an enhanced HDTV baseband signal for further processing by an HDTV processor 52. Delay circuit 41 is provided between tuner and demodulator 21 and summer 42 to compensate for processing delay. The HDTV signal is enhanced because the 1.75 MHz NTSC interference beat at the output of tuner and demodulator 21 is reduced.

Figure 5:
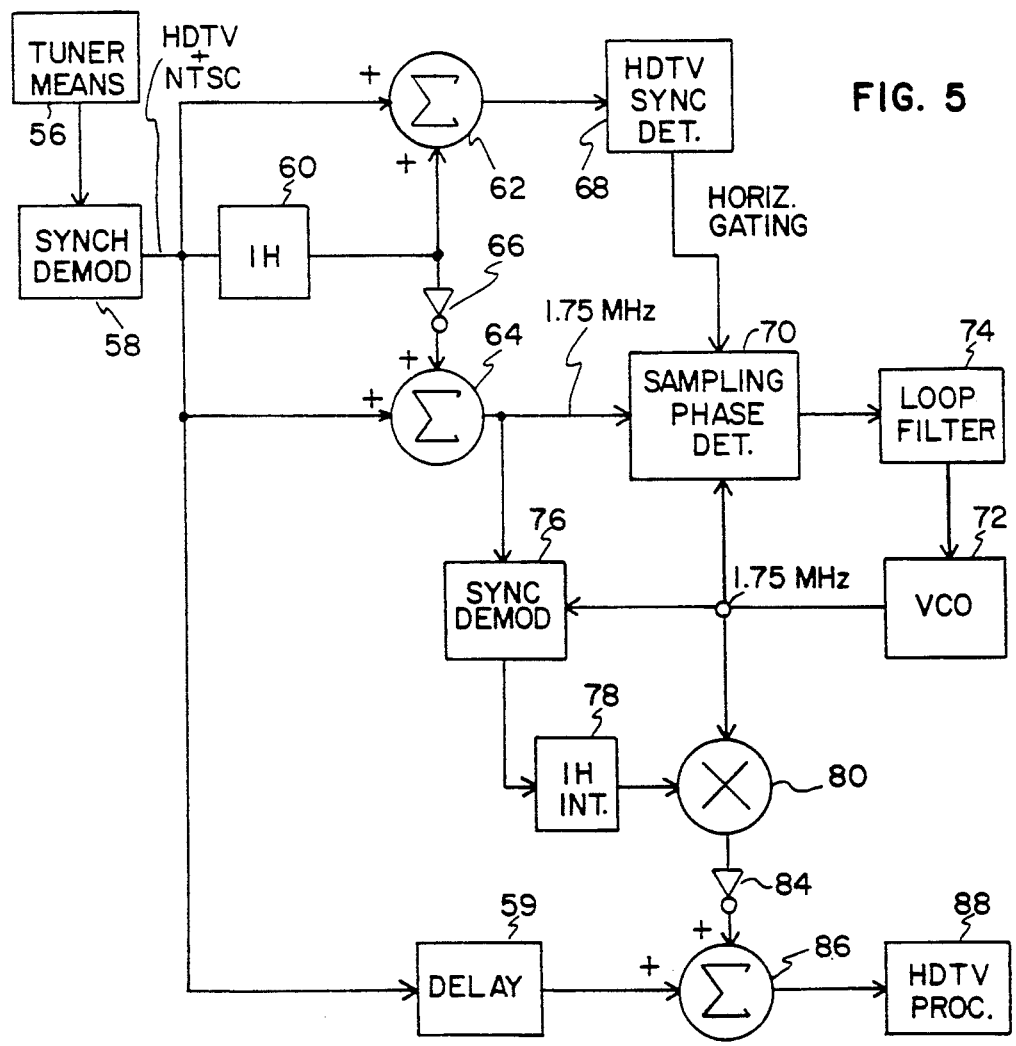
FIG. 5 is a still more detailed block diagram of an HDTV receiver constructed in accordance with the invention.

In FIG. 5, a more specific embodiment is illustrated in which a tuner means 56 supplies an output consisting of an HDTV IF signal and an NTSC IF co-channel signal to a synchronous demodulator 58. The output of demodulator 58, which includes the baseband HDTV signal and a 1.75 MHz NTSC interference beat, in turn supplies a comb filtering arrangement comprising a one horizontal line delay circuit 60, a pair of summers 62 and 64 and an inverter 66. Because of the line repetitive nature of the sync signals in the HDTV signal, addition of successive lines results in the HDTV sync signals adding and subtraction of successive lines results in the HDTV sync signals cancelling. Also, by offsetting the HDTV carrier frequency from the NTSC cochannel carrier frequency by an odd multiple of one-half the NTSC line rate, and assuming vertical correlation of the NTSC interfering signal, successive NTSC lines when added cancel and when subtracted reinforce each other. Thus, the output of summer 62 comprises enhanced HDTV sync signals while the output of summer 64 comprises primarily a 1.75 MHz NTSC interference beat signal. The HDTV sync signal developed at the output of summer 62 is detected in an HDTV sync detector 68 and supplied therefrom as a horizontal gating signal to a sampling phase detector 70. The output of summer 64 is supplied to phase detector 70 and to a synchronous demodulator 76. The output of phase detector 70 comprises a 1.75 MHz signal largely uncorrupted by the HDTV signal since it is sampled only during the sync intervals thereof. This signal is supplied to a loop filter 75 which in turn is coupled to a voltage controlled oscillator (VCO) 72. VCO 72 supplies a constant amplitude 1.75 MHz sinewave signal to phase detector 70, to synchronous demodulator 76 and to a multiplier 80. Synchronous demodulator 76 demodulates the 1.75 MHz NTSC interference beat at the output of summer 64 in response to the 1.75 MHz sinewave from VCO 72 and supplies the demodulated signal to a one horizontal line integrator 78, the output of which is coupled to a second input of multiplier 80. The output of multiplier 80, which therefore comprises a 1.75 MHz sinewave amplitude modulated by the output of line integrator 78 and representing the low frequency, high energy components of the interfering NTSC signal, is supplied to an inverter 84 for producing a subtraction signal for a summer 86. The detected HDTV signal, along with the 1.75 MHz NTSC interference beat signal from synchronous demodulator 58, is supplied through a suitable delay circuit 59 to summer 86 where the regenerated amplitude modulated 1.75 MHz sinewave is subtracted from the received signal. The output of summer 86 therefore produces an enhanced HDTV signal, in which the NTSC interference is largely cancelled, that is applied to an HDTV processor 88 for further processing. In this embodiment, the comb filters provide very attractive arrangements for developing the HDTV sync signals and the NTSC 1.75 MHz interference signal. VCO 72 free runs and is locked to the 1.75 MHz beat, which is in the form of a constant amplitude since wave as described in connection with FIG. 4. The amount of the interference signal subtracted is determined by the line integrator.

As will be appreciated by those skilled in the art, the invention has been described very broadly since specific details will depend upon the particular circuit implementation selected. However, the general technique for minimizing the interfering effects of a co-channel NTSC signal in an HDTV receiver is clearly discernible from the disclosure. The method will be seen by those skilled in the art as being equally applicable to analog signals, digital signals and hybrid signals to reduce the interfering effects of the NTSC signal by removing a percentage of the high energy components therein.

It is recognized that those skilled in the art will readily perceive numerous additions and changes in the described embodiment of the invention without departing from its true spirit and scope. The invention is to be limited only as defined in the claims.

What is claimed is:

1. A method of reducing NTSC co-channel interference in an HDTV receiver comprising:
   receiving both the NTSC and the HDTV signal;
   developing an interference signal representing substantially only high energy components of the NTSC signal; and
   combining said interference signal with the received signals to reduce the effects of the high energy components of said NTSC signal in said HDTV signal.

2. The method of claim 1 further including:
   developing a local signal corresponding to the carrier frequency of said NTSC signal; and
   using said local signal to develop said interference signal.

3. The method of claim 2 wherein said interference signal consists of low frequency, high energy components of said NTSC signal as determined by said local signal.

4. A method of reducing NTSC co-channel interference in an HDTV receiver comprising:
   receiving both the NTSC and the HDTV signal;
   developing a local signal corresponding to the carrier frequency of said NTSC signal;

developing an interference signal representing the low frequency, high energy components of said NTSC signal as determined by said local signal; and combining said interference signal with the received signals to reduce the effects of the high energy components of said NTSC signal in said HDTV signal.

5. An HDTV receiver subject to simultaneous receipt of an HDTV signal and a co-channel NTSC signal comprising:

means for developing a received signal including both said HDTV signal and said NTSC signal;

means for developing an interference signal from said received signal representing the high energy components of said NTSC signal; and means for subtracting said interference signal from said received signal.

6. The receiver of claim 5 further including means for developing a local signal corresponding to the carrier of said NTSC signal and amplitude modulating said local signal to develop said interference signal.

7. The receiver of claim 6 wherein said interference signal comprises the low frequency components of said NTSC signal.

8. The receiver of claim 7 further including comb filter means for developing both HDTV sync information and said interference signal.

9. For use in a noncompatible HDTV/NTSC television system, an HDTV receiver subject to simultaneous receipt of an HDTV signal and an interfering co-channel NTSC signal comprising:

means for developing a received signal including both said HDTV signal and said interfering co-channel NTSC signal; and means for reducing the magnitude of said interfering co-channel NTSC signal without significantly affecting said received HDTV signal.

10. The receiver of claim 9 wherein said reducing means comprise:

means for deriving a local signal responsive to the carrier of said received NTSC signal;

means for developing an interference signal, comprising the low frequency components of said NTSC signal, responsive to the amplitude of said local signal; and means for subtracting said interference signal from said received signal.

11. An HDTV receiver subject to simultaneous receipt of an HDTV signal and a co-channel NTSC signal comprising:

means for developing a received signal including both said HDTV signal and said NTSC signal;

means for deriving a local signal corresponding to the carrier of said NTSC signal;

means for developing an interference signal responsive to the amplitude of said local signal representing the low frequency, high energy components of said NTSC signal; and means for subtracting said interference signal from said received signal.

12. The receiver of claim 11 wherein said received signal is at IF frequency and wherein said developing means includes bandpass means, synchronous detector means and line averaging means.

* * * * *